United States Patent Office 2,991,274
Patented July 4, 1961

2,991,274
OIL-LESS ALKYD RESINS BASED ON ISO-PHTHALIC ACID AS PLASTICIZERS FOR UREA-ALDEHYDE RESINS AND THE LIKE
Earl F. Carlston, El Cerrito, and Gordon B. Johnson, Berkeley, Calif.
No Drawing. Filed Mar. 16, 1959, Ser. No. 799,405
14 Claims. (Cl. 260—76)

This invention relates to the preparation of heat convertible polyesters suitable for plasticizing amino plastic resins which are employed as baking-type surface coatings or enamels. More particularly, the invention contemplates the preparation of heat-convertible polyesters which when incorporated in or reacted with an amino plastic resin, e.g., urea-formaldehyde and melamine formaldehyde resins, result in baking-type surface coatings or enamels which have superior properties of hardness, resistance to various solvents, e.g., water, alkali and organic solvents; resistance to discoloration upon heating at elevated temperatures, etc. The amino resins plasticized with polyesters of this invention are useful in many applications where a hard and resistant coating is desired, e.g., for automobiles; appliances, such as refrigerators, stoves, laundering equipment; and the like.

This is a continuation-in-part of our copending application Serial No. 575,367, filed April 2, 1956, now abandoned.

Conventional enamel coatings are prepared by reacting a nondrying oil or fatty acid, such as coconut, with glycerol and phthalic acid to produce an oil-modified alkyd resin. Customarily, this alkyd resin will have an oil length of the order of 30–35%, and an excess of hydroxyl groups of the order of 4 to 6 polyol units per 100 parts of alkyd. The alkyd is then mixed with a melamine-formaldehyde resin or urea-formaldehyde resin, in an amount of the order of 70 parts alkyd and 30 parts melamine or urea resin, the resulting composition being then baked.

It has now been found that a superior polyester or oil-less alkyd for use in amino plastic resins as surface coating compositions can be obtained by the interaction of certain ingredients, whose use is critical in producing the desired results. More particularly, the invention contemplates the preparation of a polyester derived from 2-ethylhexoic acid; trimethylol ethane, trimethylolpropane, glycerol, pentaerythritol, or dipentaerythritol; propylene glycol, 1,3-butanediol, 2,2-dimethyl-1,3-propanediol, or 2,2-diethyl-1,3-propanediol; the aromatic acids, isophthalic acid, and 5-tertiarybutyl isophthalic acid.

In preparing the polyester suitable amounts of the various ingredients in mol ratios may range about as follows: dihydric alcohol to aromatic acid, 0,3 to 0.6; polyhydric alcohol to aromatic acid, 0.2 to 1.0; and 2-ethylhexoic acid to aromatic acid, 0.4 to 0.7.

The heat-convertible polyester can be prepared by heating the ingredients together at a temperature sufficiently high to liberate water (e.g., 350° F. to 450° F.) and for a time sufficient to obtain the desired acid number.

A convenient way of preparing the polyesters contemplated by the invention is to condense the 2-ethylhexoic acid with trimethylol ethane until esterification is complete, that is, until no further evolution of water occurs. Elevated temperatures up to the boiling point of the lower boiling 2-ethylhexoic acid are advantageously employed. Thus, temperatures of the order of 250° F. to 425° F. are satisfactory.

Following reaction, the reaction mixture is cooled to a temperature below the boiling point of the glycerol, e.g., propylene glycol, whereupon the glycol and aromatic acid, e.g., isophthalic acid, are added. The resulting mixture is then heated with further liberation of water to an elevated temperature to expedite reaction, e.g., 450° F., and heating continued until a product having the desired acid number is obtained, i.e., an acid number below about 20 and preferably below about 12.

Alternatively, all of the ingredients may be mixed together at one time and esterified together at elevated temperatures, e.g., 450° F., until a product having the desired acid number is obtained.

A third method of preparation which can be employed involves condensation of the glycol, e.g., propylene glycol, and the aromatic acid, e.g., isophthalic acid at elevated temperatures up to the boiling point of the glycol. When no further evolution of water occurs, the condensation product is cooled to a temperature below the boiling point of the 2-ethylhexoic acid, whereupon the 2-ethylhexoic acid and the polyhydric alcohol, e.g., trimethylol ethane are added. The resulting mixture is then heated with further liberation of water to an elevated temperature to expedite reaction, e.g., 450° F., and heating continued until a product having a desired acid number is obtained.

Further, to illustrate the practice of the invention the following examples are given.

EXAMPLE 1

A resin identified as Alkyd 3231-2 is prepared as follows: (1) 350 g. trimethylol ethane and 320 g. of 2-ethylhexoic acid are mixed and heated from 78° F. to 434° F. over a 2½ hour period. During reaction about 18 ml. of water is removed. (2) The mixture from (1) is allowed to cool overnight to room temperature and 774 g. of isophthalic acid and 177 g. propylene glycol are then added. The reaction mixture is heated from room temperature to 450° F. over a period of six hours. Reaction is continued at 450° F. for 2½ hours. About 202 ml. of water is removed during reaction, the final product having an acid number of 12.5. The final product is then dissolved in xylene to make a 50% solution. The viscosity of this solution is V-W (Gardner-Holdt) and has a color of 1 (Gardner).

EXAMPLE 2

A heat-convertible polyester employing glycerol as the trihydric alcohol and identified as Alkyd 3139-15 is prepared as follows: (1) 156.5 g. of glycerol and 173 g. of 2-ethylhexoic acid are mixed and heated from 70° F. to 420° F. in 45 minutes and then reacted at 420° F. for 2¼ hours. (2) The mixture from (1) above is cooled to 350° F. and 332 g. isophthalic acid and 35.7 g. propylene glycol are added. The product has an acid number of 10.9 and a 50% solution in xylene and has a viscosity of F (Gardner-Holdt). The reaction mixture is then heated to 420° F. in 2 hours and continued at 420° F. for 2½ hours. During reaction 90 ml. of water is removed.

EXAMPLE 3

A heat-convertible polyester employing 1,3-butanediol as the glycol and identified as Alkyd 3231-5 is prepared as follows: (1) 150 g. of trimethylol ethane and 130 g. of 2-ethylhexoic acid are mixed and heated from 70° F. to 420° F. over a period of 3 hours. During reaction 6 ml. of water is removed. (2) The mixture from (1) above is cooled to 350° F. and 332 g. of isophthalic acid and 90 g. of 1,3-butanediol are added. The reaction mixture is then heated from 350 to 450° F. for 5 hours. The reaction is continued at 450° F. for 4 hours. During reaction 78 ml. of water is removed. The product has an acid number of 3.23 and a 50% solution in a solvent containing 90% xylene and 10% butyl alcohol has a viscosity of M (Gardner-Holdt).

EXAMPLE 4

A resin, identified as Alkyd 3357-25, is prepared as follows: (1) 86 g. of pentaerythritol, 131 g. of 2-ethylhexoic acid, 123 g. of propylene glycol, and 332 g. of isophthalic acid were mixed together and heated from 75° F. to 460° F. over a 3 hour period. The reaction is continued at 460° F. for 6 hours. Approximately 84 ml. of water is removed during the reaction, the final product having an acid number of 17. The final product is then dissolved in xylene to make a 50% solution. The viscosity of this solution is $Z-Z_1$ (Gardner-Holdt) and has a color of 2-3 (Gardner).

EXAMPLE 5

A resin, identified as Alkyd 3369-41, employing dipentaerythritol as the polyhydric alcohol, is prepared as follows: 152 g. propylene glycol, 136 g. 2-ethylhexoic acid, 332 g. isophthalic acid, and 102 g. dipentaerythritol are mixed and heated from 70° F. to 450° F. over a period of about 7 hours. The ingredients are held at 450° F. for an additional hour. A total of 86 ml. of water are removed during the reaction. The product is diluted to 50% by weight in a solvent mixture of 90% xylene —10% n-butyl alcohol. The resin solution has a Gardner-Holdt viscosity of 0 and an acid number of 18.4.

EXAMPLE 6

A heat-convertible polyester employing trimethylol propane as the polyhydric alcohol and identified as Alkyd 3441-16, is prepared as follows: (1) 274 g. of 2-ethylhexoic acid and 336 g. of trimethylol propane are mixed and heated from 70° F. to 450° F. over a period of 5¼ hours and held at 450° F. for an additional hour; 26 g. of water is collected overhead during this first part of the preparation. The product is allowed to cool overnight. (2) 152 g. of propylene glycol and 664 g. of isophthalic acid are then added to (1) above and the new mixture is heated to 450° F. over a period of about 8 hours. The mixture is then held at 450° F. for an additional 4½ hours. An additional 158 g. of water are removed during the reaction to make the total water from the resin preparation 184 g. The product, which has an acid number of 7.7, gives a Gardner-Holdt viscosity of K when dissolved to 50% by weight in xylene.

EXAMPLE 7

A heat-convertible polyester containing 2,2-dimethyl 1,3-propanediol (neopentyl glycol) as the dihydric alcohol and identified as Alkyd 3441-21 is prepared as follows: (1) 151 g. of 2-ethylhexoic acid and 98 g. of pentaerythritol are mixed and heated from 70° F. to 450° F. in approximately 4½ hours and then held at 450° F. for an additional hour. Water removed during this part of the reaction is approximately 14 ml. (2) The product from (1) above is allowed to cool to 350° F. and to it is added 164 g. of neopentyl glycol (2,2-dimethyl 1,3-propanediol) and 332 g. of isophthalic acid and the mixture is heated to 450° F. over a period of about 4 hours. The batch is then held at 450° F. for an additional 6 hours. An additional 75 ml. of water of reaction is obtained during this latter step to make a total of 89 ml. of water removed during the preparation. The finished product has an acid number of 9.3 and a Gardner-Holdt viscosity of R-S when dissolved to 50% by weight in xylene.

EXAMPLE 8

A resin, identified as Alkyd 3441-9, employing 2,2-diethyl 1,3-propanediol as the dihydric alcohol, is prepared as follows: (1) 148 g. of 2-ethylhexoic acid and 168 g. of trimethylol ethane are mixed and heated from 70° F. to 440° F. in 4½ hours. The temperature is held at 440° F. for an additional 3½ hours while a total of 12 ml. of water is removed from the reaction. The product is allowed to cool to room temperature overnight. (2) 109 g. of 2,2-diethyl 1,3-propanediol and 332 g. of isophthalic acid are added to the product from (1) above and the new mixture heated to 450° F. over a period of about 3½ hours, following which the ingredients are held at 450° F. for approximately 4 hours. An additional 73 ml. of water of reaction are removed to bring the total to about 85 ml. of water for the preparation. The finished product has an acid number of 8.2.

The alkyds prepared in Examples 1 to 8 are then mixed in known fashion with the amino plastic resin and cured in a circulating air oven. The baked resin is then compared for hardness with typical commercial alkyds mixed with the same amino resin in accordance with the Sward Hardness Test as described, for example, on page 165 of the publication Physical and Chemical Examination of Paints, Varnishes, Lacquers and Colors by Henry A. Gardner and G. G. Sward, 11th edition, January 1950.

The Alkyds ZA-272 and Beckosol 1307 appearing in Table I are well known commercial oil-modified resins sold, respectively, by General Electric Co. and Reichhold Chemical Company. Alkyd ZA-272 is prepared from phthalic anhydride, glycerol and coconut fatty acids. It has an oil length of 34% and an acid number of 10. Beckosol 1307 is also phthalic anhydride baking alkyd composition derived from phthalic anhydride, glycerol and soybean oil. It has an oil length of 41% and an acid number of 10.

In Table I below, F-200E is a commercially available amino plastic resin of the urea type, sold by the Rohm & Haas Company and characterized as having a solids content of 50%±2%, soluble in xylol-butanol solvent in a ratio of 1:1. It moreover has an acid number of 4 to 8, a specific gravity of 1.01, a viscosity of W-Z (Gardner-Holdt) at 25° C. and is colorless and clear, and is present in the finished composition in the indicated percentages, by weight.

TABLE I

Sward hardness, baked ½ hr. at 250° F.

| Alkyd | F-200E, Percent | Hardness |
|---|---|---|
| 3231-2 | 15 | 46 |
|  | 30 | 56 |
| 3139-15 | 15 | 36 |
|  | 30 | 41 |
| 3231-5 | 15 | 40 |
|  | 30 | 47 |
| 3357-25 | 15 | 49 |
|  | 30 | 58 |
| ZA-272 | 15 | 19 |
|  | 30 | 30 |
| Beckosol 1307 | 15 | 20 |
|  | 30 | 31 |
| 3369-41 | 15 | 36 |
| 3441-16 | 15 | 38 |
| 3441-21 | 15 | 39 |
| 3441-9 | 15 | 44 |

It will be noted that the Alkyds 3231-2, 3139-15, 3231-5, 3357-25, 3369-41, 3441-16, 3441—21 and 3441-9, based on isophthalic acid and 2-ethylhexoic acid employed in a clear baking finish composition impart greater hardness than the other two conventional resins after baking.

Another comparative test between resins plasticized with the heat-convertible polyesters prepared in accordance with the invention and those of the prior art can be performed. This test, known as the Water Resistance Test, is carried out by immersing in water, at a temperature of 70° C. and for the indicated times, a glass plate coated with a film of the plasticized resin about 1.5 mils thick when dried. The film may satisfactorily be applied with a 50% solution in xylene. The test is satisfactorily passed if the finish on the glass remains clear and does not peel or blister. F-200E identified the same material employed in the experiments of Table I. It is mixed with the plasticizing resins in the indicated percentages, by weight. As in Table I, the finished compositon was baked for ½ hour at 250° F.

Alkyd Resin 3071-15 in Table II is prepared by: (1) Mixing 180 g. of trimethylol ethane and 200 g. of lauric acid and heating from 180° to 430° F. over a 1-hour 40-minute period. About 12 ml. of water is removed. (2) The mixture prepared in (1) is cooled to 200° F. whereupon 332 g. of isophthalic acid and 57 g. of propylene glycol are added. The reaction mixture is continued at 450° F. for an additional 2 hours. 73 ml. of water is removed during the reaction. The final product has an acid number of 9, and a 50% solution with xylene, a viscosity of U (Gardner-Holdt).

The Alkyd Resin identified as 2915-27 in Table II is prepared as follows: (1) 300 g. of trimethylol ethane and 316 g. of pelargonic acid are mixed and reacted at 450° F. for 1 hour. 33 ml. of water is removed. (2) The mixture of (1) is cooled to 200° F. and 664 g. of isophthalic acid and 152 g. of propylene glycol are added. The reaction mixture is heated from 200° F. to 450° F. over a 3½ hour period and the reaction continued for an additional 5 hours. 136 ml. of water is removed during the reaction. The acid number of the product is 15 and a 50% solution in xylene has a viscosity of I (Gardner-Holdt).

The Alkyd Resin identified as 3071-23 in Table II is prepared as follows: (1) 150 g. of trimethylol ethane and 130 g. of 2-ethylhexoic acid are mixed and heated from 70° F. to 430° F. over a 40-minute period. (2) The mixture from (1) above is cooled at 350° F. and 332 g. of isophthalic acid and 76 g. of propylene glycol are then added. The reaction mixture is then heated from 350° to 450° over a 4 hour period. The reaction is continued at 450° F. for 2½ hours. 85 ml. of water are removed during the reaction. The product has an acid number of 11. A 50% solution in xylene has a viscosity of U-V (Gardner-Holdt) and a color of less than 1 (Gardner).

TABLE II

*Water resistance*

| Alkyd | F-200E, Percent | Immersion Time, Hours | | | |
|---|---|---|---|---|---|
| | | 24 | 48 | 72 | 168 |
| 3071-15 (lauric) | 20 | Slight haze. | Opaque, peels from glass. | | |
| 2915-27 (pelargonic) | 20 | OK | ___do___ | | |
| 3071-23 (2-ethylhexoic) | 20 | OK | OK | OK | OK |

Inspection of the data in Table II indicates that the use in the plasticizing resin of a straight chain saturated aliphatic monobasic acid, such as lauric or pelargonic, cannot be regarded as the equivalent of 2-ethylhexoic acid. Thus, the composition based on Alkyd 3071-23, the resin contemplated by the invention, is satisfactory throughout the indicated periods of immersion. The composition based on Alkyd 3071-15 is substantially entirely unsatisfactory and the composition of Alkyd 2915-27 shows failure after 24 hours immersion.

The resins prepared in accordance with the present invention are still superior in their resistance to alkali. This is shown by the Alkali Resistance Test, Table III, the resins employed having been described in connection with Table I. Glass plates are coated with the different resins as previously described (Runs of Table II) and baked at 250° F. for ½ hour and aged at room temperature for 4 days. On the coating of the various plates is then deposited a drop of alkali solutions of the indicated concentrations. At an elapsed time of 25 hours the increase in diameter of the drop is measured, the greater the increase in size the less resistant the resin.

TABLE III

*Alkali resistance*

| Alkyd | F-200E, Percent | Drop Increase, Percent | | | |
|---|---|---|---|---|---|
| | | 1% NaOH | 2% NaOH | 3% NaOH | 6% NaOH |
| 3231-2 | 15 | 0 | 33 | 18 | 0 |
| | 30 | 0 | 25 | 13 | 13 |
| ZA-272 | 15 | 57 | 50 | 50 | 50 |
| | 30 | 0 | 23 | 33 | 10 |
| Beckosol 1307 | 15 | 43 | 167 | 75 | 256 |
| | 30 | 125 | 326 | 300 | 326 |

Inspection of the table clearly indicates that plasticized resins prepared in accordance with the invention are far superior in prior art compositions at substantially all concentrations.

The plasticized resins of the present invention are also more resistant to organic solvents. To show this property, same resins are employed in the runs of Table III are subjected to testing according to the Official Rating System of the Federation of Paint and Varnish Clubs. The organic solvent employed is a petroleum stock analyzing 13% paraffins, 70% naphthenes and 17% aromatics. This stock has an ASTM D-86 distillation range of 309° to 390° F.

In performing this test, glass plates are coated as previously described (Runs of Table II), and baked for 13 days at 250° F. The coated plates are then immersed in the solvent for 24 hours. The degree of attack of the various finishes, i.e., blistering and peeling, is assigned a relative rating, the numberal 1 indicating the poorest resistance and the numeral 10 that no attack of the finish is apparent.

TABLE IV

*Resistance to organic solvent 24 hours immersion after 13 days aging*

| Alkyd | F-200E, Percent | Rating |
|---|---|---|
| 3231-2 | 15 | 10 |
| | 30 | 10 |
| ZA-272 | 15 | 5 |
| | 30 | 4 |
| Beckosol 1307 | 15 | 7 |
| | 30 | 6 |

It is noted that the organic solvent had no deleterious effect on the finish prepared in accordance with the present invention.

As above indicated, another advantage surrounding the resins of the present invention is their color stability or resistance to discoloration on baking. This color stability is best illustrated by preparing pigmented paints with the resins and then measuring the change in color of the paints on baking. Data showing the color stability, as measured by photoelectric tristimulus colorimetry are given in Tables V and VI.

The resin identified as 3231-2 was the same as that employed in runs of Table I while the Alkyd Resin 3139-23 was prepared by: (1) mixing 150 g. of trimethylol ethane with 130 g. of 2-ethylhexoic acid and heating from 70° F. to 420° F. over a 2½ hour period. (2) The mixture from (1) was cooled to 280° F. and 296 g. of phthalic anhydride and 76 g. of propylene glycol were added. The reaction mixture was heated from 280° F. to 340° F. over a period of 3 hours and 40 minutes. The reaction was continued at 450° F. for 4 hours and 20 minutes. 54 ml. of water was removed during the reaction. The acid number of the final product was 20.6 and a 50% solution in xylene had a viscosity of E-F (Gardner-Holdt) and a color of less than 1 (Gardner).

White enamels were prepared with both Alkyd Resin 3231-2 and 3139-23 by mixing each with titanium dioxide, Titanox RANC a product of the Titanium Corporation. Each pigmented resin was mixed with the urea-formaldehyde resin Uforimte F-200E and baked with results shown in Table V.

TABLE V
Color stability on baking

| Resin | TiO₂, Percent | Resin/Urea Formaldehyde Ratio | Baking Conditions | Yellowness Factor Y [1] |
|---|---|---|---|---|
| 3231-2 | 25 | 70/30 | ½ hr., 250° F | −0.0400 |
| 3231-2 | 25 | 70/30 | 1 hr., 250° F +1½ hr., 400° F | −0.0411 |
| 3139-23 | 25 | 70/30 | ½ hr., 250° F | −0.0439 |
| 3139-23 | 25 | 70/30 | 1 hr., 250° F +1½ hr., 400° F | −0.0137 |

[1] Yellowness=$A-B/G$ as determined by photoelectric tristimulus colorimetry described in U.S. Department of Commerce Circular C 429. Increasing Y values indicate increasing yellowness. Zero is assigned to pure $M_gO$. Negative values are whiter, positive values are yellower.

The tabulated data clearly indicate that the use of isophthalic acid in place of phthalic anhydride results in a finish which is superior in resistance to discoloration upon heating.

Table VI further illustrates the color stability of the resins of the present invention. Alkyd 3231-2 is the same as that employed in the runs of Table I, while Alkyd Resin 2915-48 is prepared by (1) 405 g. trimethylol ethane and 324 g. 2-ethylhexoic acid are mixed and heated from 75° F. to 190° F. in 1¾ hours. (2) 666 g. tertiarybutyl isophthalic acid is added to mixture (1) above and the resultant reaction mixture heated to 450° F. over a 7 hour period. 136 ml. of water is removed during the reaction. The acid number of the product is 15 and a 50% solution in xylene has a viscosity of E (Gardner-Holdt).

White enamels were prepared by mixing the resins in Table VI with titanium dioxide, and with the melamine-formaldehyde resin Uformite MM-55, a product of the Rohm and Haas Corporation.

TABLE VI
Color stability on baking

| Alkyd | TiO₂, Percent | Alkyd-Melamine Formaldehyde Ratio | Baking Conditions | Yellowness Factor Y |
|---|---|---|---|---|
| 3231-2 | 25 | 85/15 | 1 hr., 250° F +2 hrs., 400° F | −1.73 +3.57 |
| 2915-48 | 25 | 85/15 | 1 hr., 250° F +2 hrs., 400° F | −0.57 ±0 |
| ZA-272 | 25 | 85/15 | 1 hr., 250° F +2 hrs., 400° F | −1.73 +5.95 |

The tabulated data clearly indicate that the alkyd resins of the present invention have greater color stability than the present conventional products.

Obviously many modifications and variations of the invention, as hereinbefore set forth, may be made without departing from the spirit and scope thereof and, therefore, only such limitations should be imposed as are indicated in the appended claims.

We claim:
1. A heat-convertible polyester suitable for plasticizing amino plastic resins useful as baking-type surface coatings which is obtained by condensing at temperatures in the range 250–450° F. and to an acid number below about 20 a polyhydric alcohol selected from the group consisting of trimethylol ethane, glycerol, pentaerythritol, trimethylol propane and dipentaerythritol; 2-ethylhexoic acid; a glycol selected from the group consisting of propylene glycol, 1,3-butanediol 2,2-dimethyl-1,3-propanediol, and 2,2-diethyl-1,3-propanediol, and an aromatic acid selected from the group consisting of isophthalic acid, and 5-tertiarybutyl isophthalic acid; the aforesaid materials being present in about the following mol ratios: glycol to aromatic acid, 0.2 to 0.6; polyhydric alcohol to aromatic acid, 0.2 to 1.0; and 2-ethylhexoic acid to aromatic acid 0.4 to 0.7.

2. Composition according to claim 1 wherein the glycol is propylene glycol.

3. Composition according to claim 1 wherein the polyhydric alcohol is glycerol.

4. Composition according to claim 1 wherein the polyhydric alcohol is pentaerythritol.

5. Composition according to claim 4 wherein the glycol is 2,2-dimethyl-1,3-propanediol.

6. Composition according to claim 1 wherein the polyhydric alcohol is trimethylol ethane.

7. Composition according to claim 6 wherein the glycol is 2,2-diethyl-1,3-propanediol.

8. Composition according to claim 1 wherein the polyhydric alcohol is trimethylol ethane; the glycol 1,3-butanediol; and the aromatic acid, isophthalic acid.

9. Composition according to claim 1 wherein the aromatic acid is isophthalic acid.

10. Composition according to claim 9 wherein the glycol is propylene glycol.

11. Composition according to claim 10 wherein the polyhydric alcohol is dipentaerythritol.

12. Composition according to claim 1 wherein the glycol is 1,3-butanediol.

13. Composition according to claim 3 wherein the glycol is 1,3-butanediol.

14. Composition according to claim 8 wherein the polyhydric alcohol is trimethylol propane.

References Cited in the file of this patent

UNITED STATES PATENTS

| | | |
|---|---|---|
| 2,437,657 | West et al. | Mar. 9, 1948 |
| 2,560,319 | West et al. | July 10, 1951 |
| 2,627,508 | Lum | Feb. 3, 1953 |
| 2,686,739 | Kohl | Aug. 17, 1954 |